(12) United States Patent
Bookbinder et al.

(10) Patent No.: US 9,360,619 B2
(45) Date of Patent: Jun. 7, 2016

(54) MOATLESS BEND-OPTIMIZED MULTIMODE FIBER

(71) Applicant: Corning Incorporated, Corning, NY (US)

(72) Inventors: Dana Craig Bookbinder, Corning, NY (US); Oleksandr Kogan, Wilmington, NC (US); Ming-Jun Li, Horseheads, NY (US); Snigdharaj Kumar Mishra, Wilmington, NC (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/734,160

(22) Filed: Jun. 9, 2015

(65) Prior Publication Data

US 2015/0378092 A1 Dec. 31, 2015

Related U.S. Application Data

(60) Provisional application No. 62/016,707, filed on Jun. 25, 2014.

(51) Int. Cl.
*G02B 6/02* (2006.01)
*G02B 6/028* (2006.01)
*G02B 6/036* (2006.01)

(52) U.S. Cl.
CPC ............ *G02B 6/0288* (2013.01); *G02B 6/0281* (2013.01); *G02B 6/03627* (2013.01); *G02B 6/03694* (2013.01)

(58) Field of Classification Search
CPC .. G02B 6/0288; G02B 6/0281; G02B 6/3627; G02B 6/3644; G02B 6/3694
USPC .................................................. 385/123–128
See application file for complete search history.

(56) References Cited

U.S. PATENT DOCUMENTS

| | | | |
|---|---|---|---|
| 5,841,933 A | 11/1998 | Hoaglin et al. | |
| 7,646,955 B2 | 1/2010 | Donlagic | |
| 8,385,702 B2 | 2/2013 | Bickham et al. | |
| 8,406,592 B2 | 3/2013 | Abbott, III et al. | |
| 2009/0154888 A1* | 6/2009 | Abbott, III | G02B 6/0365 385/124 |
| 2012/0230638 A1* | 9/2012 | Bickham | G02B 6/0288 385/124 |
| 2012/0275751 A1* | 11/2012 | Krabshuis | G02B 6/0281 385/126 |

FOREIGN PATENT DOCUMENTS

CN 102768382 A 11/2012

OTHER PUBLICATIONS

J.M. Arnold; "Asymptotic evaluation of the normalised cut-off frequencies of an optical waveguide with quadratic index variation." Microwaves, Optics and Acoustics, Nov. 1977, vol. I, No. 6, p. 203.

* cited by examiner

*Primary Examiner* — Akm Enayet Ullah
*Assistant Examiner* — Michael Mooney
(74) *Attorney, Agent, or Firm* — Svetlana Z. Short

(57) ABSTRACT

An optical fiber including a multimode core having a radius, $R_1$, and a maximum relative refractive index, $\alpha_{1MAX}$, at a wavelength $\lambda_0$, an inner clad region surrounding the core and having a radial thickness, $T_2$, and a minimum relative refractive index, $\Delta_{2MIN}$, of about 0.0% at a wavelength of $\lambda_0$, and an outer clad layer, which is doped with chlorine at greater than or equal to 0.5 weight %, surrounding the inner clad region and having a radial thickness, $T_3$, and a maximum relative refractive index, $\Delta_{3MAX}$, at a wavelength of $\lambda_0$. The optical fiber satisfies the following relationship: $\Delta_{1MAX} > \Delta_{3MAX} > \Delta_{2MIN}$, and the optical fiber exhibits an overfilled bandwidth of greater than or equal to about 1.5 GHz-km at $\lambda_0$.

20 Claims, 4 Drawing Sheets

US 9,360,619 B2

MOATLESS BEND-OPTIMIZED MULTIMODE FIBER

CROSS-REFERENCE TO RELATED APPLICATIONS

This application claims the benefit of priority under 35 U.S.C. §119 of U.S. Provisional Application Ser. No. 62/016,707 filed on Jun. 25, 2014 the contents of which are relied upon and incorporated herein by reference in their entirety.

BACKGROUND

1. Field

The present disclosure relates generally to optical fibers, and particularly to bend insensitive optical fibers comprising a low index of refraction region therein.

2. Technical Background

Glass optical fibers with improved bend loss properties have recently been of significant interest in the telecommunications field. Techniques for improving fiber bending properties can play important roles in many types of fibers, including transmission fibers used in long distance, multimode fibers used in the emerging area of fiber to the home applications, and dispersion compensation fibers where bending loss has limited many designs from practical use. In certain applications such as fiber to the home applications, the ability to form a tight bending diameter is desired with negligible bending loss. Many of the proposed solutions for this problem involve significant modification of the fiber refractive index profile.

SUMMARY

According to one embodiment shown and described herein a multimode optical fiber having a graded index core with a core radius, $R_1$, and a maximum relative refractive index, $\Delta_{1MAX}$, at a wavelength $\lambda_o$, an inner clad region surrounding the core and having a radial thickness, $T_2$, and a minimum relative refractive index, $\Delta_{2MIN}$, of about 0.0% at a wavelength of $\lambda_o$, and an outer clad layer, which is doped with chlorine at greater than or equal to 0.5 weight %, surrounding the inner clad region and having a radial thickness, $T_3$, and a maximum relative refractive index, $\Delta_{3MAX}$, at wavelength of $\lambda_o$. The optical fiber satisfies the following relationship: $\Delta_{1MAX} > \Delta_{3MAX} > \Delta_{2MIN}$, and the optical fiber exhibits an overfilled bandwidth of greater than or equal to about 1.5 GHz-km at wavelength of $\lambda_o$.

According to another embodiment shown and described herein is a multimode optical fiber having a graded index core with a core radius, $R_1$, and a maximum relative refractive index, $\Delta_{1MAX}$, at wavelength of 850 nm, an inner clad region surrounding the core and having a radial thickness $T_2$, and a minimum relative refractive index, $\Delta_{2MIN}$, of about 0.0% at wavelength of 850 nm, and an outer clad layer, which is doped with chlorine at greater than 0.5 weight percent, surrounding the inner clad region and having a radius, $R_3$, and a maximum relative refractive index, $\Delta_{3MAX}$, of greater than or equal to about 0.05% to less than or equal to about 0.25% at wavelength of 850 nm. The optical fiber satisfies the following relationship: $\Delta_{1MAX} > \Delta_{3MAX} > \Delta_{2MIN}$. Further, $R_1$ is from greater than or equal to about 20 microns to less than or equal to about 30 microns, $T_2$ is greater than or equal to about 10 microns, the inner clad region is an extension of the core, and the optical fiber exhibits an overfilled bandwidth of greater than or equal to about 1.5 GHz-km at a wavelength of 850 nm.

Additional features and advantages of embodiments will be set forth in the detailed description which follows, and in part will be readily apparent to those skilled in the art from that description or recognized by practicing embodiments as described herein, including the detailed description which follows, the claims, as well as the appended drawings.

It is to be understood that both the foregoing general description and the following detailed description present embodiments, and are intended to provide an overview or framework for understanding the nature and character of embodiments as they are claimed. The accompanying drawings are included to provide a further understanding of embodiments, and are incorporated into and constitute a part of this specification. The drawings illustrate various embodiments, and together with the description serve to explain the principles and operations of embodiments.

DETAILED DESCRIPTION

Figure 1:
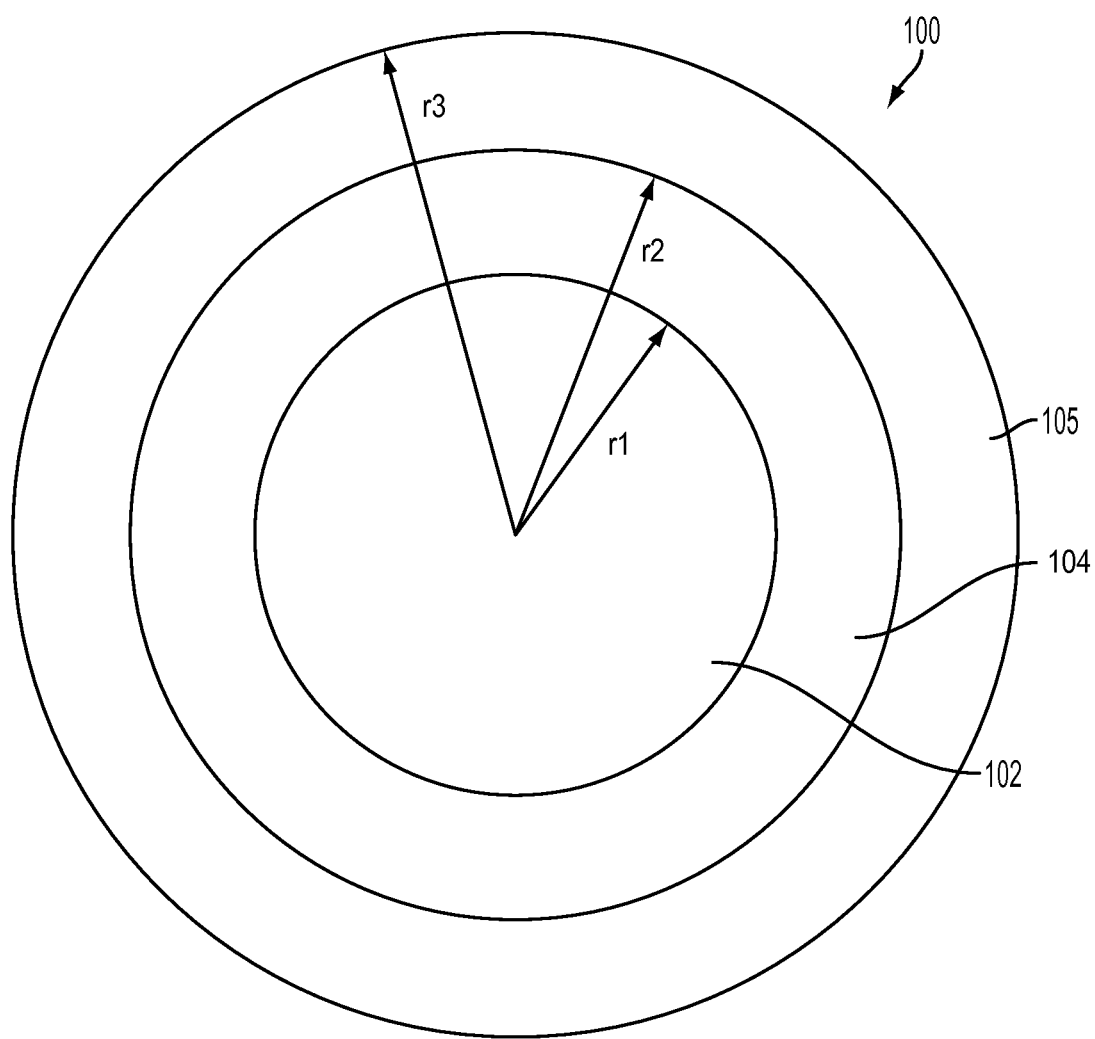
FIG. 1 is a schematic cross sectional view of an optical fiber according to one or more embodiments shown and described herein.

The "refractive index profile," as used herein, is the relationship between refractive index or relative refractive index and waveguide fiber radius.

"Relative refractive index," as used herein, is defined as:

$$\Delta_i\% = 100 \times \frac{(n_i^2 - n_{ref}^2)}{2n_i^2}$$

where $n_i$ is the maximum refractive index in region i, unless otherwise specified, and $n_{ref}$ is the refractive index of pure silica glass, unless otherwise specified. Accordingly, as used herein, the relative refractive index percent is relative to pure silica glass.

It should be understood that the phrase "pure silica glass," as used herein, means that the region or layer of optical fiber comprising "pure silica glass" does not contain material, such as dopants and/or other trace materials, in an amount which would significantly alter the refractive index of the silica glass region or portion. However, small amounts of dopants (e.g., chlorine and/or fluorine in an amount less than 1500 ppm of each) may be present in the region or portion that is otherwise "pure silica."

More specifically, as used herein, $\Delta_{1MAX}$ refers to the maximum relative refractive index of a core of the optical fiber, $\Delta_{2MIN}$ refers to the minimum relative refractive index of an inner clad region of the optical fiber and $\Delta_{3MAX}$ refers to the maximum relative refractive index of an outer clad layer of the optical fiber. The relative refractive indexes are given in percentages.

The term "α-profile" or "alpha profile," as used herein, refers to a relative refractive index profile, expressed in terms of Δ which is in units of "%", where r is the radius and which follows the equation, $$\Delta = \Delta_{1max}\left[1-\left(\frac{r}{r_1}\right)^\alpha\right],$$

where $\Delta_{1max}$ is the maximum relative refractive index, $R_1$ is the radius of the core, r is in the range $r_i \le r \le r_f$, Δ is as defined above, $r_i$ is the initial point of the α-profile, $r_f$ is the final point of the α-profile, and α is an exponent which is a real number. For a step index profile, the alpha value is greater than or equal to 10. For a graded index profile, the alpha value is less than 10. The term "parabolic," as used herein, includes substantially parabolic shaped refractive index profiles which may vary slightly from an α value of 2.0 at one or more points in the core, as well as profiles with minor variations and/or a centerline dip.

The bend resistance or bend performance of an optical fiber may be measured by the induced attenuation of light propagating through the fiber under prescribed test conditions. As used herein, the 15 and 30 mm macrobend tests for measuring the bend performance of an optical fiber consist of wrapping the fiber 2 times around a 15 and 30 mm mandrel, respectively, and calculating the induced attenuation (i.e. the increase in attenuation) caused by wrapping the fiber around the mandrel.

Unless otherwise specified herein, measurements of the properties of the optical fiber are taken at a wavelength, $\lambda_0$, of 850 nm.

FIG. 1 schematically shows a cross section of an optical fiber according to one or more embodiments shown and described herein. Embodiments of optical fibers described herein generally comprise a glass portion comprising a core and an inner clad region disposed on the core. In some embodiments, the inner clad region is an extension of the core. In other embodiments, the inner clad region is a distinct layer from the core. In embodiments, the inner clad region is surrounded by an outer clad layer. The structure and composition of the optical fibers as well as the properties of the optical fibers will be described and discussed in more detail herein.

Referring to FIG. 1, a cross section of an optical fiber and the corresponding refractive index profile for the optical fiber are shown according to embodiments described herein. The optical fiber generally comprises a glass core 102, an inner clad region 104 may surround the core 102, and an outer clad layer 106 may surround the inner clad region 104. In embodiments, the core 102, the inner clad region 104, and the outer clad layer 106 generally comprise silica, specifically silica-based glass. The core 102 and the outer clad layer 106 may comprise up dopants, as described in more detail herein below. The cross section of the optical fiber 100 may be generally circular-symmetric with respect to the center of the core 102 and the core 102 may have a radius $R_1$. The inner clad region 104 may surround the core 102 and extend from the radius $R_1$ to the radius $R_2$ such that the inner clad region has a radial thickness $T_2=R_2-R_1$. The outer clad layer 106 may surround the inner clad region 104 and extend from the radius $R_2$ to the radius $R_3$ ($R_3$ is the outer radius of the glass optical fiber) such that the outer clad layer has a radial thickness $T_3=R_3-R_2$. Accordingly, the optical fiber (e.g., the core 102, inner clad region 104 and outer clad layer 106) may have an outer diameter $2R_3$.

As described herein, the core 102 of the optical fiber 100 has a radius $R_1$. In embodiments, the optical fiber 100 may be a multi-mode optical fiber. Accordingly, in some embodiments, the radius $R_1$ may be from greater than or equal to about 20 microns to less than or equal to about 30 microns, such as from greater than or equal to about 22 microns to less than or equal to about 28 microns. In other embodiments, the radius $R_1$ may be from greater than or equal to about 25 microns to less than or equal to about 27 microns. However, it will be understood that the core 102 may have different dimensions to facilitate various other multi-mode embodiments.

In some embodiments, the core 102 comprises silica glass ($SiO_2$) and one or more index of refraction raising dopants (referred to hereinafter as "up dopants") such as, for example, $GeO_2$, $Al_2O_3$, $P_2O_5$, $TiO_2$, $ZrO_2$, $Nb_2O_5$ and/or $Ta_2O_5$. In some embodiments, the core 102 is up-doped with $GeO_2$. For example, in embodiments, the core is up-doped with from greater than or equal to about 14.0 weight % to less than or equal to about 25.5 weight % $GeO_2$. Accordingly, in embodiments, the core 102 may comprise from greater than or equal to about 16.0 weight % to less than or equal to about 23.5 weight % $GeO_2$, or from greater than or equal to about 18.0 weight % to less than or equal to about 21.5 weight % $GeO_2$. Accordingly, when the core 102 is up-doped with an up dopant, such as, for example $GeO_2$, as described herein, the maximum relative refractive index $\Delta_{1MAX}$ of the core 102 may be from greater than or equal to about 0.80% to less than or equal to about 1.40%, such as from greater than or equal to about 0.9% to less than or equal to about 1.30%. In other embodiments, the maximum relative refractive index $\Delta_{1MAX}$ of the core 102 may be from greater than or equal to about 1.00% to less than or equal to about 1.25%. In the exemplary refractive index profile of the optical fiber 100 shown in FIGS. 2-4, the core 102 is up-doped such that the refractive index of the core is greater than the refractive index of pure silica glass ($n_{si}$).

Figure 2:
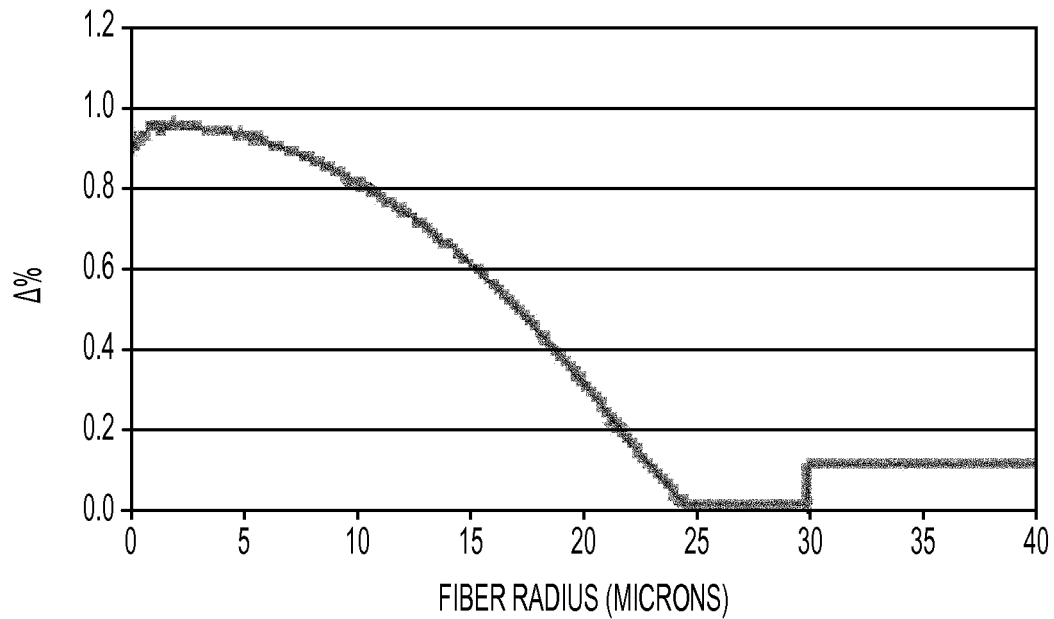
FIG. 2 graphically depicts a relative refractive index profile of an optical fiber according to one embodiment shown and described herein.
Figure 3:
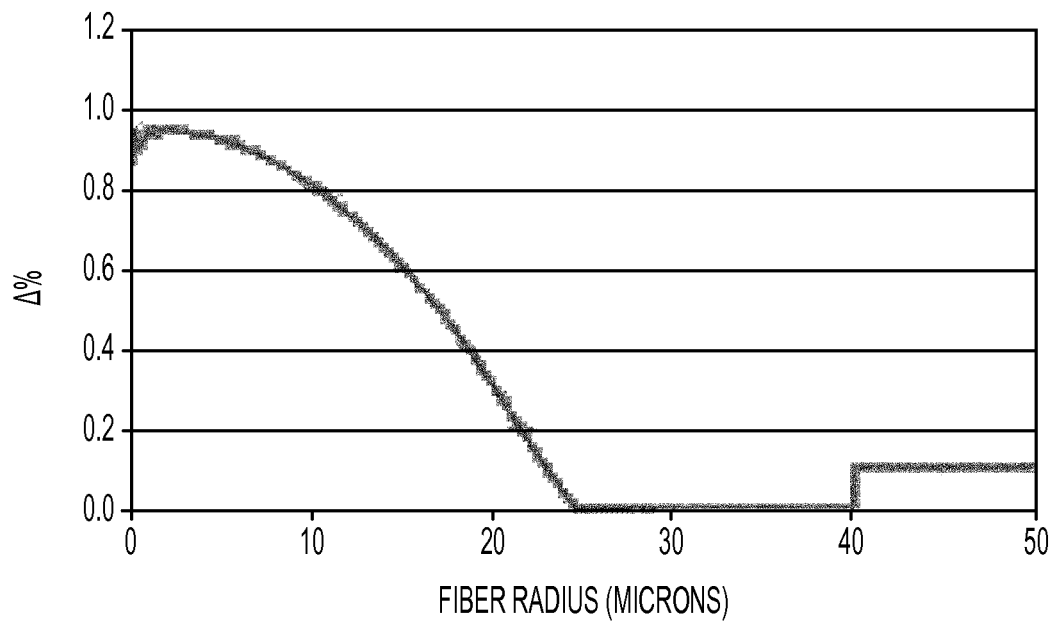
FIG. 3 graphically depicts a relative refractive index profile of an optical fiber according to another embodiment shown and described herein.
Figure 4:
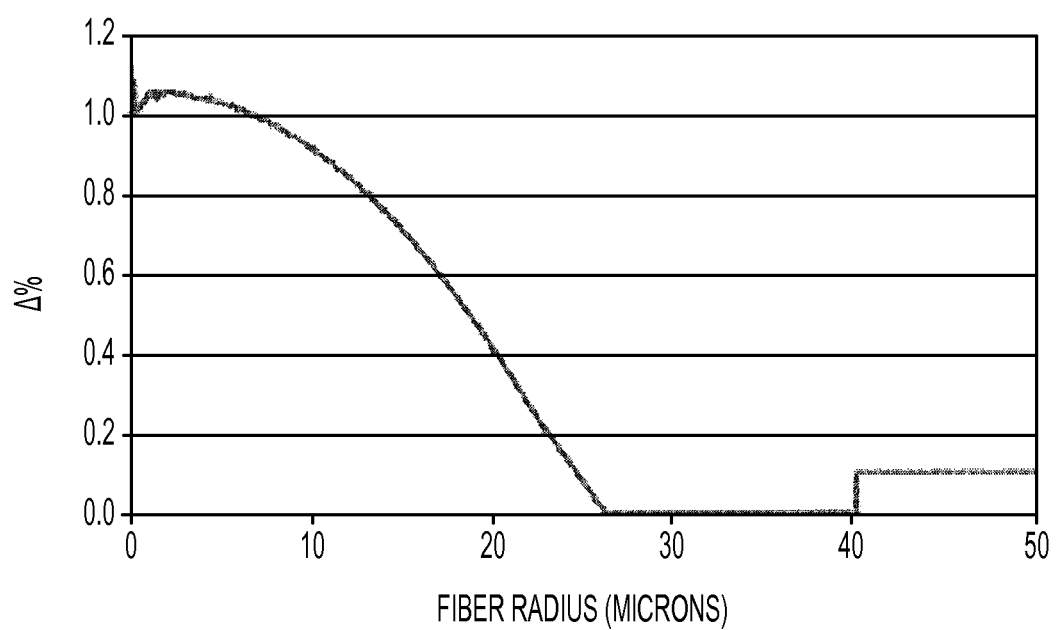
FIG. 4 graphically depicts a relative refractive index profile of an optical fiber according to another embodiment shown and described herein.

As described above, the clad 102 has an alpha profile that describes the profile of the core 102, such as the profile shown in the refractive index profile of, for example, FIGS. 2-4. In embodiments, α may be from greater than or equal to about 1.95 to less than or equal to about 2.20, such as from greater than or equal to about 2.00 to less than or equal to about 2.15. In some embodiments, α may be about 2.12. When measured utilizing light having a wavelength of about 1060 nm, α of the core may be about 2.06, and when measured utilizing light having a wavelength of about 1300 nm, a of the core may be about 2.02.

As described herein, the inner clad region 104 has a radial thickness $T_2=R_2-R_1$. The radial thickness $T_2$ of the of the inner clad region 104 may depend on the desired dimensions of the core 102 and the desired dimensions and bend properties of the glass portion of the optical fiber 100 (discussed further herein). In embodiments, the inner clad region may have a radial thickness of greater than or equal to about 7.0 microns, such as greater than or equal to about 9.0 microns. In other embodiments, the inner clad region may have a radial thickness of greater than or equal to about 10.0 microns, such as greater than or equal to about 12.0 microns. In embodiments, the inner clad region may have a radial thickness of less than or equal to about 30.0 microns, such as less than or equal to about 25.0 microns.

According to embodiments, the inner clad region 104 may comprise pure silica glass ($SiO_2$), which has a minimum refractive index, $\Delta_{2MIN}$, of about 0.0%. Accordingly, the inner clad region is essentially free of dopants, such as, for example, fluorine. For example, in one embodiment, the inner clad region is pure silica glass as shown in the exemplary refractive index profiles depicted in FIGS. 2-4. In embodiments, the composition of the inner clad region 104 and the composition of the core 102 may be such that the difference between $\Delta_{1MAX}$ and $\Delta_{2MIN}$ may be greater than or equal to about 0.9%, such as greater than or equal to about 0.95%. In some embodiments, the difference between $\Delta_{1MAX}$ and $\Delta_{2MIN}$ may be less than or equal to about 1.40%, such as less than or equal to about 1.30%.

In embodiments, the radial thickness of the inner clad region 104 may be interrelated with the value of $\Delta_{3MAX}$. More specifically, the inner clad region 104 may have a volume profile $V_2$ such that:

$$V_2 = 2\int_{r1}^{r2} \Delta_{3MAX}(r)\,dr,$$

which may be rewritten as:

$$V_2 = \Delta_{3MAX}(r_2^2 - r_1^2).$$

The volume index $V_2$ of the inner clad region 104 (also referred to herein as moat volume) is from greater than or equal to about 60.0%-microns$^2$ to less than or equal to about 220%-microns$^2$, such as from greater than or equal to about 90.0%-microns$^2$ to less than or equal to about 190.0%-microns$^2$. In other embodiments, the volume index $V_2$ of the inner clad region 104 is from greater than or equal to about 120.0%-microns$^2$ to less than or equal to about 160.0%-microns$^2$, such as from greater than or equal to about 140.0%-microns$^2$ to less than or equal to about 150.0%-microns$^2$.

According to embodiments, the outer clad layer 106 has a radial thickness $T_3 = R_3 - R_2$. In embodiments, the radial thickness $T_3$ of the outer clad layer 106 may be greater than or equal to about 12.5 microns, such as greater than or equal to about 17.5 microns. In other embodiments, the radial thickness $T_3$ of the outer clad layer 106 may be greater than or equal to about 22.5 microns, such as greater than or equal to about 27.5 microns. In embodiments, the radial thickness $T_3$ of the outer clad layer 106 may be less than or equal to about 32.5 microns.

In embodiments, the outer clad layer 106 comprises silica glass up-doped with chlorine. For example, the outer clad layer 106 may comprise from greater than or equal to about 0.5 weight % chlorine, such as from greater than or equal to about 0.5 weight % to less than or equal to about 2.5 weight % chlorine. In some embodiments, the outer clad layer 106 may comprise from greater than or equal to about 0.7 weight % to less than or equal to about 2.0 weight % chlorine, such as from greater than or equal to about 1.0 weight % to less than or equal to about 1.8 weight % chlorine. In embodiments, the outer clad layer 106 may be up-doped with chlorine such that the maximum relative refractive index ($\Delta_{3MAX}$) of the outer clad layer 106 relative to pure silica glass is greater than or equal to about 0.05% to less than or equal to about 0.25%, such as from greater than or equal to about 0.07% to less than or equal to about 0.20%. In some embodiments, the outer clad layer 106 may be up-doped with chlorine such that the maximum relative refractive index ($\Delta_{3MAX}$) of the outer clad layer 106 relative to pure silica glass is greater than or equal to about 0.10% to less than or equal to about 0.18%.

As described hereinabove, according to embodiments, the relative refractive indexes of the core 102, the inner clad portion 104, and the outer clad layer 106 satisfy the following relationship: $\Delta_{1MAX} > \Delta_{3MAX} > \Delta_{2MIN}$.

The relative refractive indexes described above for each of the core 102, the inner clad region 104, and the outer clad layer 106 may be measured at a wavelength $\lambda_0$. In embodiments, $\lambda_0$ may be from greater than or equal to about 800 nm to less than or equal to about 1600 nm, such as from greater than or equal to about 840 nm to less than or equal to about 860 nm. In other embodiments, $\lambda_0$ may be from greater than or equal to about 960 nm to less than or equal to about 1000 nm, or from greater than or equal to about 1040 nm to less than or equal to about 1080 nm. In yet other embodiments, $\lambda_0$ may be from greater than or equal to about 1260 nm to less than or equal to about 1340 nm. In some other embodiments, may be about 850 nm.

Optical fibers of embodiments disclosed herein, exhibit overfilled bandwidth of greater than or equal to about 1.5 GHz-km at $\lambda_0$. In some embodiments, the optical fiber exhibits an overfilled bandwidth that is greater than or equal to about 2.5 GHz-km at a wavelength of 4, such as greater than or equal to about 5.0 GHz-km at a wavelength of $\lambda_0$. In yet other embodiments, the optical fiber exhibits an overfilled bandwidth of greater than or equal to about 6.5 GHz-km at a wavelength of $\lambda_0$, such as greater than or equal to about 7.5 GHz-km at a wavelength of $\lambda_0$. The overfilled bandwidth is measured according to FOTP-204 using an overfilled launch, and is as described above.

According to embodiments, the optical fiber has a bend loss at 850 nm of less than or equal to about 0.2 dB when wound two turns around a mandrel having a diameter of about 15 mm, such as less than or equal to about 0.1 dB when wound two turns around a mandrel having a diameter of about 15 mm. In some embodiments, the optical fiber has a bend loss at 850 nm of less than or equal to about 0.05 dB when wound two turns around a mandrel having a diameter of about 30 mm.

In some embodiments, the optical fiber has a numerical aperture (NA) greater than or equal to about 0.15, such as greater than or equal to about 0.20. In other embodiments, the optical fiber has a numerical aperture greater than or equal to about 0.25, such as greater than or equal to about 0.30. In still other embodiments, the optical fiber has a numerical aperture greater than 0.185 and less than 0.215. The numerical aperture is defined and measured in accordance with IEC 60793-1-43 (IEC 60793-1-43, Optical fibers. Part 1-43: Measurement methods and test procedures. Numerical aperture).

In certain embodiments, the core 102, inner clad region 104, and outer clad layer 106 of the optical fiber 100 may be formed by an outside-vapor-deposition (OVD) process. The OVD process is a way of making optical fiber through reactions from the desired vapor ingredients (including silica and the other desired up dopant precursors) via a hydrolysis process in a $CH_4 + O_2$ flame to form soot-particles. The soot-particles are then collected by thermophoretic means onto either a bait rod (for making a core soot-preform) or a glass core cane or rod (for making overclad soot-preform). The soot-preform is subsequently dried and densified into solid transparent glass in a high temperature furnace (after the bait rod is removed from the core preform), a process commonly referred to as consolidation. The desired core and cladding compositions are achieved by utilizing different amounts of various vapor-phase ingredients for each of the layers in the soot preform fabrication process. For example, the core/inner clad/clad perform may be generated first, then consolidated, and the final (consolidated) preform drawn into the optical fiber 100 by known fiber-drawing methods.

More specifically, vapor-precursor-materials that may be used to make the portion of the soot preform associated with the fiber core are, for example, $SiCl_4$, $GeCl_4$, $AlCl_3$, $TiCl_4$, or $POCl_3$. As described herein, the core may comprise $GeO_2$ doped silica glass. After the up-doped $SiO_2$ soot is consolidated into the core preform, soot of pure $SiO_2$ may be deposited on the core preform to form a soot preform of the inner clad region of the optical fiber, which is thereafter consolidated to fully densified glass. The consolidated preform is then may be placed and heated in an air, nitrogen or argon purged furnace at about 800-1200° C. to outgas the helium dissolved in the glass, and then optionally placed into another furnace and redrawn into one or multiple canes (also referred to as core canes) having a parabolic refractive index doped core surrounded by a silica cladding, that is core canes having a core/inner cladding.

After the core/inner clad preform or core canes are formed, $SiO_2$ is deposited on the consolidated core/inner cladding preform/core cane to form a soot preform of the outer clad layer portion and is sometimes referred to as an overclad soot preform. The soot preform according to this embodiment may be consolidated in a furnace. The exemplary silica soot preform may be first dried at around 850° C.-1200° C. for 45-120 minutes in a furnace comprising chlorine and optionally helium. The preform is then heated to 1100 to about 1500° C. for chlorine doping and sintering to fully densified glass with either $Cl_2$ and/or $SiCl_4$ as the chlorine source dopant. After the drying, chlorine doping consolidation processes, the fully densified preform is cooled down and/or heated in an air, nitrogen or argon purged furnace at about 800-1200° C. to outgas the helium dissolved in the glass, thus making a glass optical preform having a parabolic refractive index core, a silica inner cladding and a chlorine updoped outer cladding. The preform is then taken to fiber draw. Thus by this process a high bandwidth multimode optical preform having a inner clad moat (by virtue of updoping the overclad with chlorine) is made in two soot deposition/consolidation steps and is much lower cost in manufacturing instead of an optical preform made three steps (core, then index depressed inner clad with for example fluorine doping, then overclad with silica).

The optical fiber 100 comprising an outer clad layer 106 disposed as the outermost glass portion of the optical fiber 100 may be applied to improve the bend performance of conventional fibers or enable new specialty fibers. In addition, using an inner clad region of pure silica, which is essentially free of fluorine, in combination with an outer clad layer that is up-doped with chlorine allows the fiber to be formed in a two-step process, which reduces production costs, production time, and hazards when compared to an optical fiber that has an inner clad region doped with down dopant, such as fluorine.

EXAMPLES

Embodiments will be further clarified by the following examples.

Models of optical fibers are prepared having the parameters indicated in Table 1 below:

TABLE 1

| Parameter | Example 1 | Example 2 | Example 3 | Example 4 | Example 5 | Example 6 |
|---|---|---|---|---|---|---|
| Δ1 (%) | 0.977 | 0.977 | 1.077 | 0.977 | 0.977 | 1.270 |
| $R_1$ (micron) | 24.0 | 24.0 | 29.0 | 24.0 | 24.0 | 29.0 |
| Core Alpha | 2.11 | 2.11 | 2.05 | 2.11 | 2.11 | 2.05 |
| $R_2$ (micron) | 35 | 40 | 40 | 35 | 38 | 38 |
| Δ2 (%) | 0 | 0 | 0 | 0 | 0 | 0 |
| $R_3$ (micron) | 62.5 | 62.5 | 62.5 | 62.5 | 62.5 | 62.5 |
| Δ3 (%) | 0.15 | 0.10 | 0.15 | 0.20 | 0.20 | 0.20 |
| Δ3 updopant | Cl | Cl | Cl | Cl | Cl | Cl |
| Moat volume, %-microns² | 97.4 | 102.4 | 113.9 | 129.8 | 173.6 | 120.6 |
| Numerical Aperture | 0.21 | 0.21 | 0.22 | 0.2 | 0.2 | 0.25 |
| Modeled OFL BW at 850 nm (MHz-km) | 10420 | 10420 | 12354 | 10635 | 10635 | 16865 |
| Modeled MinEMBC at 850 nm (MHz-km) | 2900 | 2900 | 1504 | 2793 | 2793 | 1396 |
| Bend loss at 850 nm, db/turn on a 1 × 15 mm mandrel | 0.07 | 0.05 | 0.03 | 0.04 | 0.025 | 0.025 |
| Bend loss at 850 nm, db/turn on a 1 × 30 mm mandrel | 0.04 | 0.03 | 0.015 | 0.025 | 0.012 | 0.012 |

Table 1 and FIGS. 2-4 show relative refractive index profiles for optical fibers according to embodiments disclosed herein. FIGS. 2-4 show relative refractive index profiles where $\Delta_{1MAX}$ is between 0.9 and 1.3%, $\Delta_{2MIN}$ is 0.0%, and $\Delta_{3MAX}$ is from about 0.1 to 0.2% and comprises chlorine-doped silica having a chlorine concentration of about 1 to 2 weight percent. In the profiles $R_1$ is about 24 to 29 microns, $T_2$ is between about 10 to 15 microns, and $T_3$ is between about 22 to 30 microns (the outer radius of the optical fibers ($R_3$) is about 62.5 microns with only 40 microns shown in FIGS. 2-4). The optical properties of the modeled fibers are shown in Table 2 below.

TABLE 2

| Mode Group | Example 1 | Example 2 | Example 3 | Example 4 | Example 5 | Example 6 |
|---|---|---|---|---|---|---|
| | | | | delay, ns/km | | |
| MG1 | 0.2003 | 0.2003 | 0.1164 | 0.2015 | 0.2015 | 0.1236 |
| MG2 | 0.1957 | 0.1957 | 0.1819 | 0.1971 | 0.1971 | 0.1930 |
| MG3 | 0.2077 | 0.2077 | 0.2340 | 0.2097 | 0.2097 | 0.2479 |
| MG4 | 0.1808 | 0.1808 | 0.2737 | 0.1829 | 0.1829 | 0.2897 |
| MG5 | 0.2003 | 0.2003 | 0.3060 | 0.2028 | 0.2028 | 0.3235 |
| MG6 | 0.1632 | 0.1632 | 0.3322 | 0.1659 | 0.1659 | 0.3508 |
| MG7 | 0.1791 | 0.1791 | 0.3536 | 0.1819 | 0.1819 | 0.3730 |

TABLE 2-continued

| Mode Group | Example 1 | Example 2 | Example 3 | Example 4 | Example 5 | Example 6 |
|---|---|---|---|---|---|---|
| | | | | delay, ns/km | | |
| MG8  | 0.1785  | 0.1785  | 0.3712 | 0.1816   | 0.1816 | 0.3911 |
| MG9  | 0.1777  | 0.1777  | 0.3853 | 0.1809   | 0.1809 | 0.4055 |
| MG10 | 0.1850  | 0.1850  | 0.3967 | 0.1885   | 0.1885 | 0.4169 |
| MG11 | 0.1835  | 0.1835  | 0.4055 | 0.1872   | 0.1872 | 0.4256 |
| MG12 | 0.1472  | 0.1472  | 0.4122 | 0.1511   | 0.1511 | 0.4320 |
| MG13 | 0.0575  | 0.0575  | 0.4167 | 0.0618   | 0.0618 | 0.4362 |
| MG14 | −0.1085 | −0.1082 | 0.4191 | −39.7327 |        | 0.4386 |
| MG15 | −0.5036 | −0.4977 | 0.4184 | −39.7303 |        | 0.4391 |
| MG16 |         |         | 0.4116 |          |        | 0.4378 |
| MG17 |         |         | 0.3888 |          |        | 0.4342 |
| MG18 |         |         | 0.3220 |          |        | 0.4266 |

Figure 5:
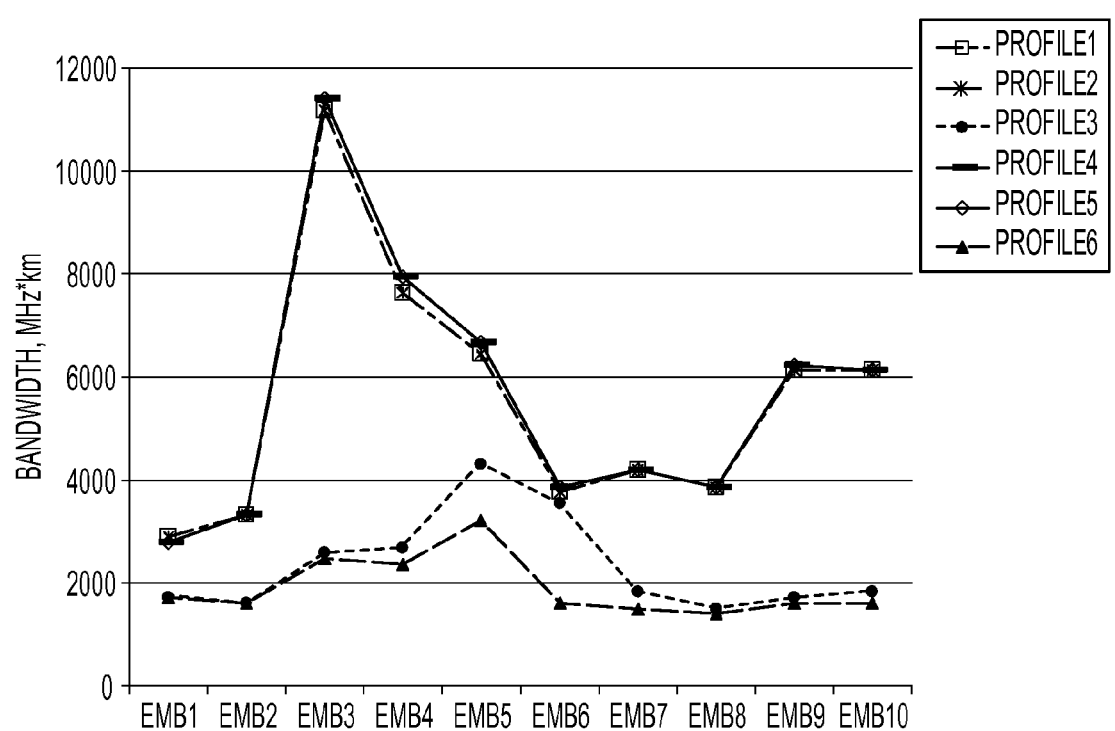
FIG. 5 graphically depicts bandwidth of optical fibers having relative refractive index profiles according to embodiments shown and described herein.

FIG. 5 illustrates the calculated effective bandwidth for each default source defined in IEC60793-2-10 (IEC60793-2-10, Optical fibers. Part 2-10: Product specifications-Sectional specification for category A1 multimode fibers). The models are based on a standard multi-mode glass optical fiber, such as Corning® ClearCurve® multimode fiber manufactured by Corning, Inc., with cores 102 having radii as shown in FIGS. 2-4 and maximum relative refractive indexes Δ1MAX relative to pure silica glass as shown in FIGS. 2-4. The outer clad layers 106 have radial thicknesses as shown in FIGS. 2-4. The radial thicknesses of the inner clad regions 104 are as shown in FIGS. 2-4. Accordingly, by varying Δ1MAX and the radial thickness of the inner clad region T2, the bandwidth of optical fibers having profiles as shown in FIGS. 2-4.

Further, as shown in the data depicted in FIG. 5, positioning the outer clad layer 106 further from the core 102 of the optical fiber 100 (e.g., as the radial thickness of the inner clad region 104 increases), It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. An optical fiber comprising:
   a multimode core having a radius, $R_1$, and a maximum relative refractive index, $\Delta_{1MAX}$, at a wavelength $\lambda_0$;
   an inner clad region surrounding the multimode core and having a radial thickness, $T_2$, and a minimum relative refractive index, $\Delta_{2MIN}$, of about 0.0% at a wavelength of $\lambda_0$; and
   an outer clad layer, which is doped with chlorine at greater than or equal to 0.5 weight %, surrounding the inner clad region and having a radial thickness, $T_3$, and a maximum relative refractive index, $\Delta_{3MAX}$, at a wavelength of $\lambda_0$, wherein
   $\Delta_{1MAX} > \Delta_{3MAX} > \Delta_{2MIN}$, and
   the optical fiber exhibits an overfilled bandwidth of greater than or equal to about 1.5 GHz-km at a wavelength of $\lambda_0$.

2. The optical fiber of claim 1 wherein $\lambda_0$ is between 800 to 1600 nm.

3. The optical fiber of claim 1 wherein $\lambda_0$ is between 840 to 860 nm.

4. The optical fiber of claim 1 wherein $\lambda_0$ is between 960 to 1000 nm.

5. The optical fiber of claim 1 wherein $\lambda_0$ is between 1040 to 1080 nm.

6. The optical fiber of claim 1 wherein $\lambda_0$ is between 1260 to 1340 nm.

7. The optical fiber of claim 1 where the inner clad region is essentially free of fluorine.

8. The optical fiber of claim 1, wherein the outer clad layer comprises from greater than or equal to about 0.5 weight % chlorine to less than or equal to about 2.5 weight % chlorine.

9. The optical fiber of claim 1, wherein the overfilled bandwidth of the optical fiber is greater than or equal to about 2.5 GHz-km at a wavelength of $\lambda_0$.

10. The optical fiber of claim 1, wherein the overfilled bandwidth of the optical fiber is greater than or equal to about 5 GHz-km at a wavelength of $\lambda_0$.

11. The optical fiber of claim 1, wherein $R_1$ is from greater than or equal to about 20 microns to less than or equal to about 30 microns.

12. The optical fiber of claim 1, wherein $\Delta_{1MAX}$ is from greater than or equal to about 0.9% to less than or equal to about 1.4%.

13. The optical fiber of claim 1, wherein $\Delta_{3MAX}$ is from greater than or equal to about 0.05% to less than or equal to about 0.25%.

14. The optical fiber of claim 1, wherein the optical fiber has a bend loss at 850 nm of less than or equal to about 0.2 dB when wound two turns on a mandrel having a diameter of about 15 mm.

15. The optical fiber of claim 1, wherein the optical fiber has an inner clad region volume of greater than or equal to about 60%-microns$^2$ to less than or equal to about 220%-microns$^2$.

16. The optical fiber of claim 1, wherein $T_2$ is greater than or equal to about 10 microns.

17. The optical fiber of claim 1, wherein $T_2$ is greater than or equal to about 12 microns.

18. An optical fiber comprising:
   a multimode core having a radius, $R_1$, and a maximum relative refractive index, $\Delta_{1MAX}$, at a wavelength of 850 nm;
   an inner clad region surrounding the multimode core and having a radial thickness, $T_2$, and a minimum relative refractive index, $\Delta_{2MIN}$, of about 0.0% at a wavelength of 850 nm; and
   an outer clad layer, which is doped with chlorine at greater than 0.5 weight percent, surrounding the inner clad region and having a radial thickness, $T_3$, and a maximum relative refractive index, $\Delta_{3MAX}$, of greater than or equal to about 0.05% to less than or equal to about 0.25% at a wavelength of 850 nm, wherein
   $\Delta_{1MAX} > \Delta_{3MAX} > \Delta_{2MIN}$,
   $R_1$ is from greater than or equal to about 20 microns to less than or equal to about 30 microns,
   $T_2$ is greater than or equal to about 10 microns,
   the inner clad region is an extension of the multimode core, and
   the optical fiber exhibits an overfilled bandwidth of greater than or equal to about 1.5 GHz-km at a wavelength of 850 nm.

19. The optical fiber of claim 18, wherein $T_2$ is greater than or equal to about 12 microns.

20. The optical fiber of claim 18, wherein the inner clad region is essentially free of fluorine.

* * * * *